United States Patent [19]

Vasa et al.

[11] Patent Number: 5,653,322
[45] Date of Patent: Aug. 5, 1997

[54] TWO PIECE CLUTCH ASSEMBLY HAVING TWIST LOCK JOINT

[75] Inventors: Ben Vasa, Rockford; Frank Robbins, Carol Stream, both of Ill.

[73] Assignee: Borg-Warner Automotive, Inc., Sterling Heights, Mich.

[21] Appl. No.: 593,629

[22] Filed: Jan. 30, 1996

[51] Int. Cl.[6] ................................. F16D 25/06
[52] U.S. Cl. .................. 192/85 AA; 192/70.13; 192/70.28; 192/112; 403/348
[58] Field of Search ............... 192/85 AA, 70.13, 192/70.28, 85 A, 112; 403/348, 349, 3, 4

[56] References Cited

U.S. PATENT DOCUMENTS

| | | |
|---|---|---|
| 3,047,115 | 7/1962 | Lee et al. . |
| 3,251,442 | 5/1966 | Aschauer . |
| 3,394,631 | 7/1968 | Thompson . |
| 3,490,312 | 1/1970 | Seitz et al. . |
| 3,596,537 | 8/1971 | Koivunen . |
| 3,610,380 | 10/1971 | Montalvo, III . |
| 3,765,519 | 10/1973 | Kell . |
| 3,848,518 | 11/1974 | Martin . |
| 4,361,217 | 11/1982 | Bieber et al. . |
| 4,733,762 | 3/1988 | Gay et al. . |
| 4,856,635 | 8/1989 | Vlamakis . |
| 5,152,726 | 10/1992 | Lederman . |
| 5,188,399 | 2/1993 | Durina ........................ 403/343 X |
| 5,233,912 | 8/1993 | Mueller ....................... 403/348 X |
| 5,397,196 | 3/1995 | Boiret et al. ..................... 403/348 |
| 5,423,405 | 6/1995 | Fukaya . |
| 5,466,195 | 11/1995 | Nogle et al. . |

*Primary Examiner*—Andrea L. Pitts
*Attorney, Agent, or Firm*—Bliss McGlynn., P.C.; Greg Dziegielewski

[57] ABSTRACT

A clutch assembly adapted to be fixed to the casing of a transmission includes a clutch housing having a clutch subassembly supported therein and a piston housing having a piston subassembly supported therein. The clutch housing and the piston housing are disposed in abutting relation relative to one another such that the piston subassembly is moveable within the piston housing to actuate the clutch subassembly in the clutch housing. At least one of the housings includes at least one anti-rotation lug mounted thereon and adapted to be received in a corresponding recess in the casing of the transmission. The anti-rotation lug includes an overlapping portion which overlays the other of the housings when they are disposed in abutting relation relative to one another. The anti-rotation lug also includes a slot. The other of the housings includes at least one tab extending therefrom and corresponds to the slot. The tab is received in the slot to lock the clutch housing and the piston housing together prior to installing the assembly in the transmission.

20 Claims, 2 Drawing Sheets

TWO PIECE CLUTCH ASSEMBLY HAVING TWIST LOCK JOINT

BACKGROUND OF THE INVENTION

1. Field of the Invention

The present invention relates, generally, to clutch assemblies for use in automotive transmissions. More specifically, the present invention relates to a two piece clutch assembly having a twist lock joint.

2. Description of the Related Art

Generally speaking, land vehicles require three basic components. These components include a power plant (such as an internal combustion engine), a power train and wheels. The power train's main component is typically referred to as the "transmission". Engine torque and speed are converted in the transmission in accordance with the tractive-power demand of the vehicle. Automotive vehicle transmissions include One or more gear sets which may include an inner sun gear, intermediate planet gears which are supported by their carriers and outer ring gears. Various components of the gear sets are held or powered to change the gear ratios in the transmission. The disc pack clutch is a device which is commonly employed as a holding mechanism in a transmission. The disc pack clutch assembly has a clutch subassembly including a set of plates and a set of friction discs which are interleaved between one another. The plates and friction discs are bathed in a continual flow of lubricant and in one disposition normally turn past one another without contact. The clutch assembly also typically includes a piston subassembly. When a component of a gear set is to be held, as for example during a gear change, a piston supported in the piston subassembly is actuated so as to cause the plates and friction discs to come into frictional contact with respect to one another.

In the past, clutch and piston subassemblies were joined together to form the disc pack clutch assembly either during the assembly of the transmission itself or immediately prior to this step. However, over the past few years, there has been a continual demand made on the suppliers of such components to provide "systems" rather than parts so that the assembly process at the vehicle manufacturing plant may be further simplified. To meet this need, the clutch and piston subassemblies can be held together prior to installation in the transmission using a plurality of spring retainer clips. Three retainer clips can be employed to clamp the two subassemblies together. Alternatively, pins and/or rivets may be employed for the same purpose. One disadvantage of this arrangement is that it adds steps in the manufacturing process and creates waste in the used retainer clips. In addition, pins and rivets do not allow for relative adjustments between the piston and clutch housings. Typically, the heads on the rivets must be ground off. Furthermore, assemblies using pins and/or rivets suffer from the disadvantage that they are rather permanent fasteners and once employed, the assembly lacks serviceability. Thus, there remains a need in the related art to reduce the number of parts that are employed during the manufacture of automotive components, such as clutch assemblies for transmissions allow for relative adjustments between assembled parts, when necessary and allow the assembly to be easily serviced.

Not only do the clutch and piston subassemblies need to be packaged together, but the clutch assembly must be specifically positioned relative to the transmission casing so as to align an apply pressure port in the piston housing with a corresponding port in the transmission casing through which fluid pressure is supplied to the piston to engage the plates and friction discs. Thus, it is important that the clutch assembly be accurately positioned relative to the transmission housing so that the proper fluid ports are aligned. Clutch assemblies in the related art suffer from the disadvantage in that there is no convenient way to quickly and accurately locate the clutch assembly relative to the transmission casing. Therefore, there is a further need to simplify the overall process of mounting clutch assemblies in automotive transmissions.

SUMMARY OF THE INVENTION

The present invention overcomes the disadvantages of the related art in a clutch assembly adapted to be quickly and accurately fixed to the casing of a transmission in a proper orientation while reducing the number of parts and simplifying the assembly process. The clutch assembly of the present invention includes a clutch housing having a clutch subassembly supported therein and a piston housing having a piston subassembly supported therein. The clutch housing and piston housing are disposed in abutting relation relative to one another such that the piston subassembly is moveable within the piston housing to actuate the clutch subassembly in the clutch housing. At least one of the housings includes at least one anti-rotation lug mounted thereon. The anti-rotation lug is adapted to be received in a corresponding recess in the casing of the transmission. The anti-rotation lug overlays the other of the housings when they are disposed in abutting relation relative to one another. The anti-rotation lug includes a slot. The other of the housings includes at least one tab extending therefrom and corresponding to the slot in the anti-rotation lug. The tab is received in the slot to lock the clutch housing and the piston housing together prior to installing the assembly in the transmission.

One advantage of the present invention is that it provides a fully assembled, two piece clutch assembly without the need for spring retainer clips to hold the assembly together. Another advantage of the present invention is that it includes at least one anti-rotation lug which is employed to be conveniently and quickly located relative to the transmission casing during installation. Thus, the anti-rotation lug not only acts to join the two piece clutch assembly during shipment and prior to installation in the transmission casing, but also serves to positively locate the clutch assembly relative to the transmission casing. Therefore, the clutch assembly of the present invention may be properly aligned with any corresponding fluid pressure ports. In this way, the clutch assembly of the present invention contributes to simplifying and reducing the steps in the manufacturing process, thereby reducing the costs thereof.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
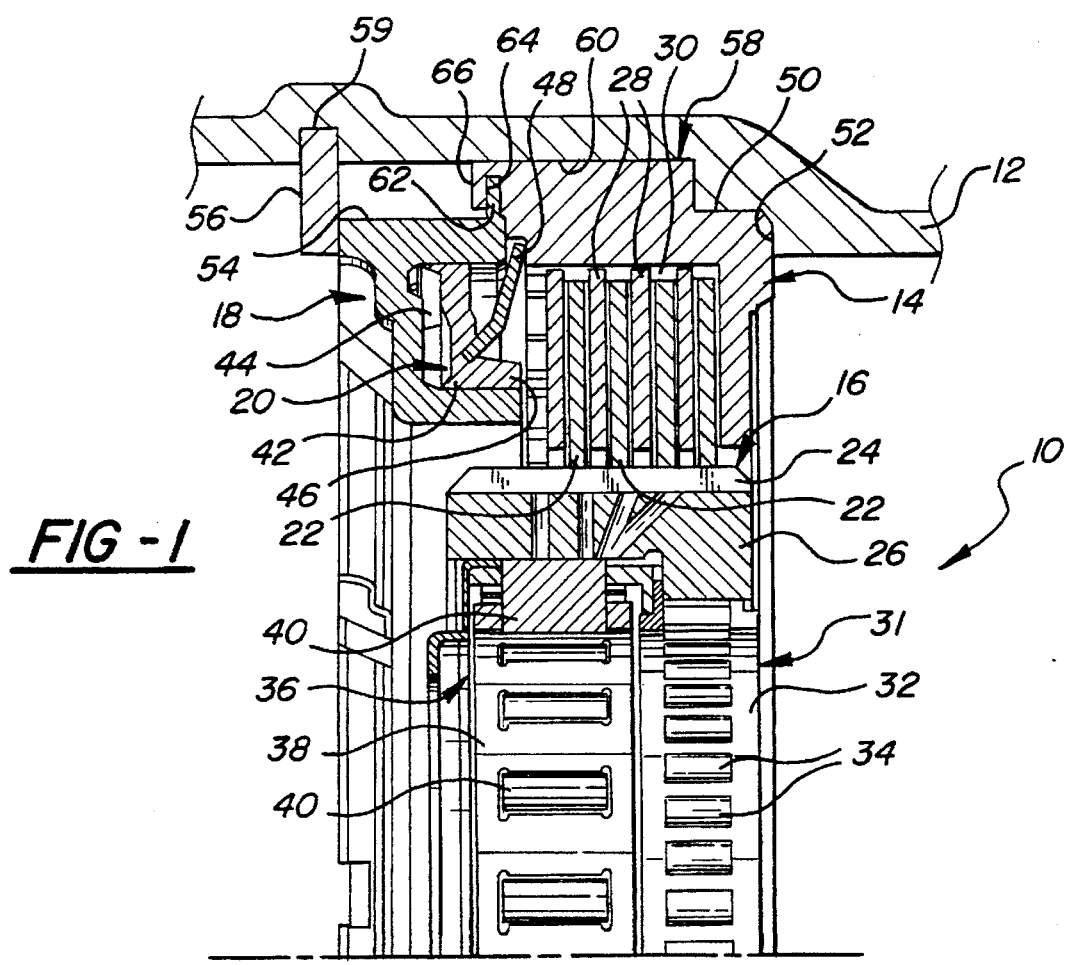
FIG. 1 is a partial cross-sectional side view of the clutch assembly of the present invention mounted in a transmission casing.

Referring now to FIG. 1, a clutch assembly is generally shown at 10. The clutch assembly 10 is adapted to be fixed or grounded to the casing 12 of an automotive transmission assembly. As is commonly known in the art, but not shown in these Figures, the transmission assembly typically includes an input shaft which is operatively coupled to a prime mover, such as an internal combustion engine. The transmission assembly also includes an output shaft which is operatively coupled to driven wheels through other drive train components such as a drive shaft and an axle having a differential. At least one, and often a plurality of, gear sets is operatively coupled between the input and output shafts. A transmission casing 12 supports the input shaft, the output shaft and the gear sets of the transmission assembly.

Various components of the gear set are held or powered to change the gear ratio in the transmission. To this end, the transmission assembly will typically include at least one clutch assembly 10, which is fixed to the transmission casing 12 as will be discussed in greater detail below. The clutch assembly 10 includes a clutch housing, generally indicated at 14, having a clutch subassembly, generally indicated at 16, supported therein. The clutch assembly 10 further includes a piston housing, generally indicated at 18, having a piston subassembly, generally indicated at 20, supported therein.

As illustrated in the Figures, the clutch subassembly 16 includes a friction clutch pack having a plurality of plates 22 splined at 24 to a friction clutch hub 26 which, in this case, also functions as a one way clutch outer race. A plurality of friction discs 28 are splined at 30 to the clutch housing 14 and interleaved between the plates 22. In one disposition, the plates 22 and friction discs 28 rotate past one another in non-contacting relationship. The friction clutch hub 26 is mounted to a roller bearing, generally indicated at 31. The roller bearing 31 includes a roller bearing cage 32 and a plurality of rollers 34 as is commonly known in the art. The clutch assembly 10 also includes a sprag type clutch mechanism generally indicated at 36 having a cage 38 and a plurality of sprags 40 held by the cage 38. The cage 38 is supported by an inner race (not shown) which is splined to a common sun gear hub (also not shown) but commonly known in the art. The clutch assembly 10 illustrated in the Figures allows for a free wheel rotation of the friction clutch hub 26 in one direction but locks up the hub 26 in the opposite direction. While the clutch assembly 10 illustrated in the figures is a one way clutch of the sprag type, those skilled in the art will appreciate that the present invention may be employed in connection with any two piece clutch assembly as will become apparent from the discussion which follows.

The clutch housing 14 and the piston housing 18 are disposed in abutting relation relative to one another such that the piston assembly 20 is moveable within the piston housing 18 to actuate the clutch subassembly 16 in the clutch housing 14. The piston subassembly 20 includes an annular piston 42 which is moveable between first and second positions. Fluid pressure is received in a chamber 44 on one side of the piston 42 via a pressure applied port (not shown) and urges the piston 42 toward its second position such that an annular contact surface 46 engages the friction discs 28 of the clutch pack. Under the force applied by the piston 42, the friction discs 28 engage and ultimately hold the plates 22 which, in turn, will hold the friction clutch hub 26 and ground the clutch subassembly 16. The piston 42 is actuated to engage the clutch pack for example in the event of a gear change as is commonly known in the art. A return spring 48 urges the piston 42 away from the clutch pack and toward its first position where it resides when the pressure in the chamber 44 is less than the force applied by the spring 48.

The clutch housing 14 is substantially annular in shape and defines an outer peripheral surface 50 which is grounded to the transmission case 12. To this end, the transmission case 12 presents a shoulder 52 which abuts the clutch housing 14. Similarly, the piston housing 18 is substantially annular in shape and defines an outer peripheral surface 54 which corresponds to the outer peripheral surface 50 of the clutch housing 14. The piston housing 18 is also grounded to the transmission case 12 via a snap ring 56 which is received in a notch 59 in the transmission case 12.

Figure 2:
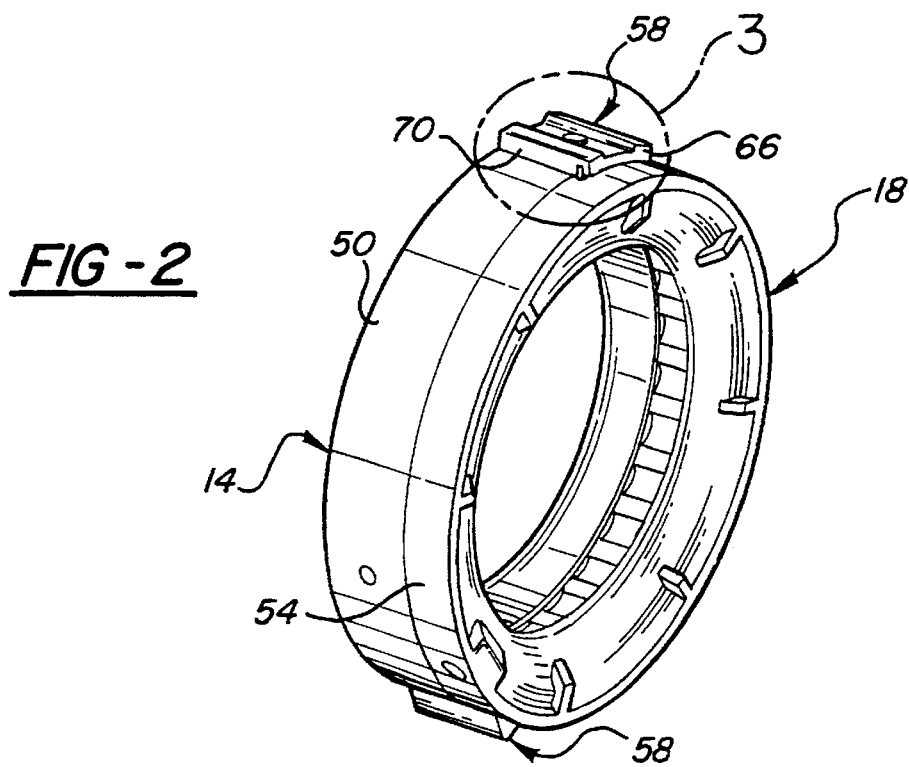
FIG. 2 is a perspective view of the clutch assembly of the present invention.
Figure 3:
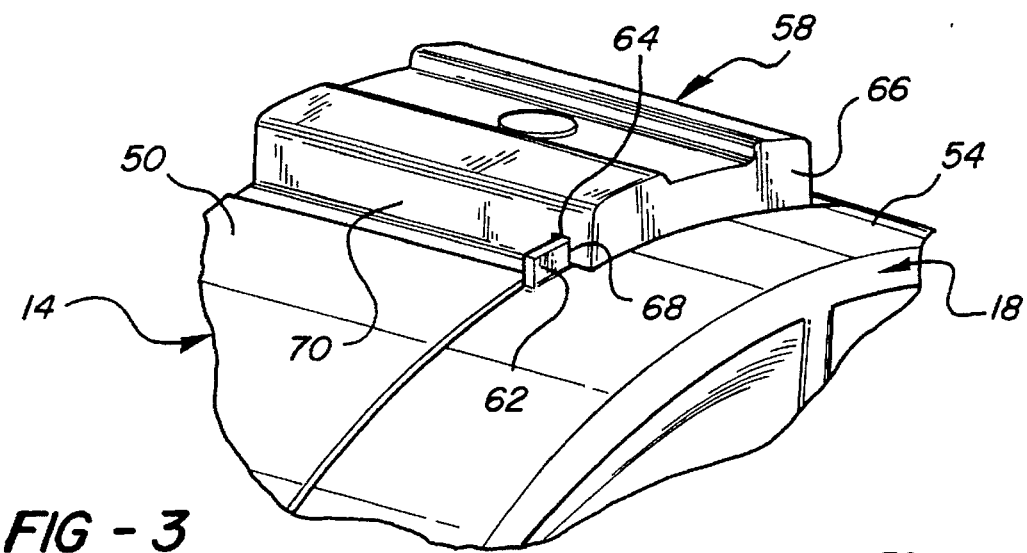
FIG. 3 is an enlarged view of the structure illustrated in circle 3 of FIG. 2.
Figure 5:
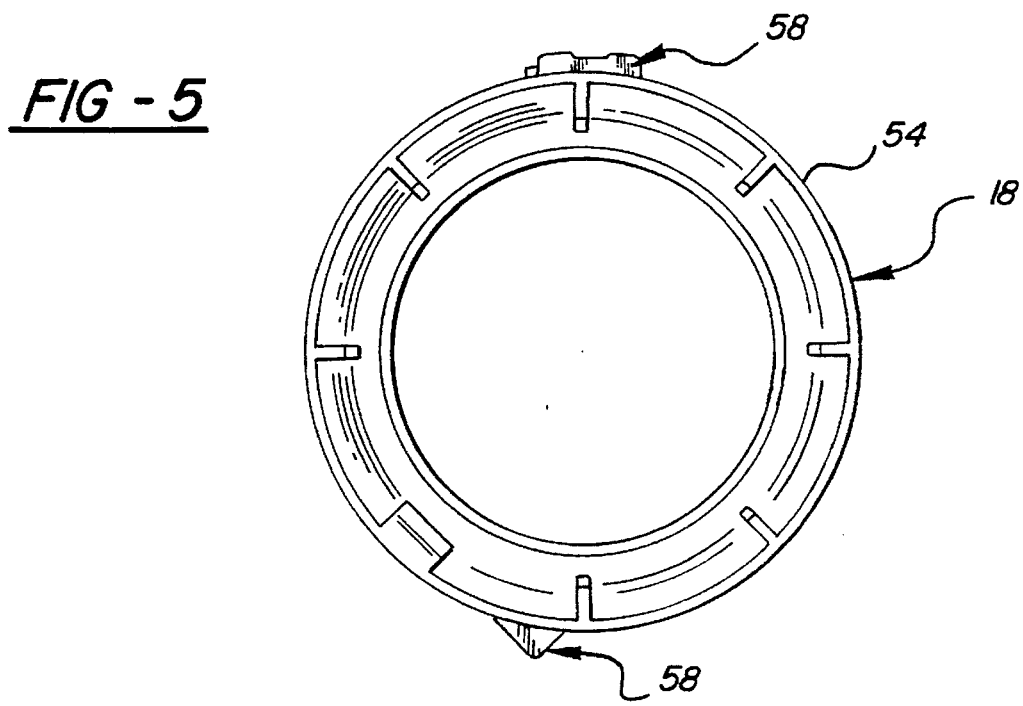
FIG. 5 is an end view of the clutch assembly of the present invention.

In the clutch assembly 10 of the present invention, at least one of the housings 14, 18 includes at least one anti-rotation lug, mounted to the housing, as generally indicated at 58. The anti-rotation lug 58 includes a portion 66 which is disposed in overlapping relation to the other of the housings 14, 18 when they are disposed in abutting relation relative to one another. In the preferred embodiment, the clutch assembly 10 includes at least two anti-rotation lugs 58 disposed on the outer peripheral surface 50 of the clutch housing 14. The anti-rotation lugs 58 are asymmetrically spaced relative to one another on the clutch housing 14 and are loosely received in corresponding recesses 60 in the transmission case 12. As best shown in FIGS. 2 and 5, the anti-rotation lugs 58 define geometric shapes which are different from one another. Thus, the anti-rotation lugs 58 guide the operator in mounting the clutch assembly 10 to the transmission case 12. For example, one of the two anti-rotation lugs 58 may define a substantially rectangular shape when viewed in cross-section and the other may define a substantially triangular shape when viewed in cross-section. The clutch assembly will therefore only be properly received by the casing 12 and mounted thereto if it is properly orientated by the operator. The shape of the lugs 58 make this task easy and substantially mistake proof. The lugs 58 are loosely received in their corresponding recesses 60 so that final adjustments may be made to properly align the pressure apply port in the piston housing (not shown) with a corresponding port in the transmission casing (also not shown) such that fluid may be received in the chamber 44 and applied against the piston 42 without leakage.

Figure 4:
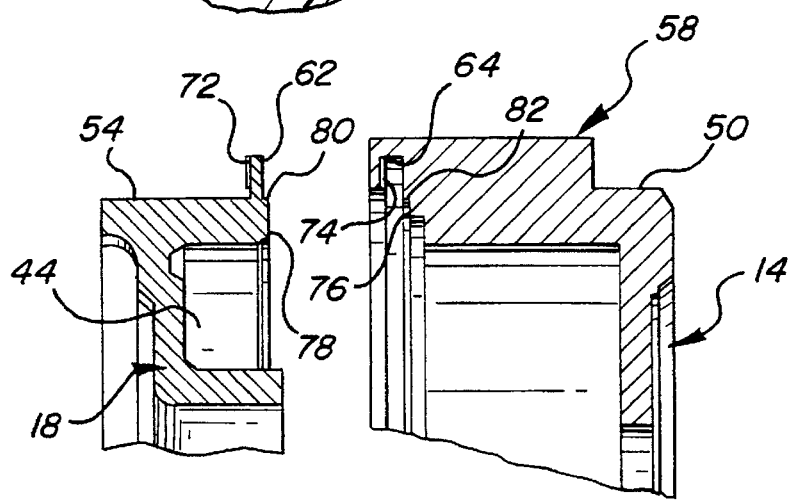
FIG. 4 is a partial cross-sectional side view of the piston and clutch housings of the present invention.

The other of the annular housings, in this case, the piston housing 18, includes at least one tab 62 radially extending therefrom. A slot 64 is formed in the overlapping portion 66 of the anti-rotation lugs 58. The tab 62 is formed on the outer peripheral surface 54 of the piston housing 18 and is received in the slot 64. In the preferred embodiment, the clutch assembly 10 includes at least two tabs 62 located on the outer peripheral surface 54 of the piston housing 18 and corresponding to the slots 64 in the overlapping portions 66 of the lugs 58. The slots 64 extend in a radial direction into the lugs 58 relative to the annular clutch assembly 10. Each slot 64 has at least one opening 68 at the side of the overlapping portions 66. The tabs 62 are received in the slots 64 through the openings 68 at the side 70 of the anti-rotation lugs 58 upon relative rotational movement between the piston housing 18 and the clutch housing 14. To this end and as best shown in FIG. 4, the tabs 62 include radially extending ridges 72. On the other hand, the slots 64 include corresponding notches 74. The ridges 72 are received in the notches 74 to locate the piston housing 18 relative to the clutch housing 14 when the tabs 62 are received in the slots 64. It should also be noted that the tabs 62 and slots 64 may be configured to have corresponding shapes and thicknesses such that a specific tab is receivable only in a specific slot thereby further simplifying the manufacturing process and eliminating the possibility for error during assembly.

The clutch housing 14 and the piston housing 18 each present opposed annular mating surfaces 76, 78 which are disposed in abutting contact relative to one another in the clutch assembly 10. The piston housing 18 includes an annular pilot flange 80 extending from its respective mating surface 78 in the direction of the clutch housing 14. The annular pilot flange 80 coacts with a corresponding surface 82 on the clutch housing 14 when the piston and clutch housings 14, 18 are rotated relative to one another such that the tab 62 is received in the slot 64 through opening 68 in a "twist lock" fashion.

The structure described above and shown in the Figures aids in the assembly of the two piece clutch assembly and provides a twist lock feature of the present invention. Furthermore, it will be appreciated by those skilled in the art that the lugs 58 may form a portion of the piston housing 18 and that the tabs 62 may form a portion of the clutch housing 14 without departing from the spirit of this invention. In either event, the tabs 62 will be received in the slots 64 to lock the clutch housing 14 and the piston housing 18 together prior to installing the clutch assembly 10 in the transmission. Thus, there is no need for spring retainer clips to hold the two piece assembly together. In addition, it is within the scope of this invention to employ a multiplicity of identical lugs and slots with unequal radial spacing or equally spaced but with one or more lugs omitted at unequal intervals. The clutch assembly of the present invention contributes to simplifying and reducing the steps in the manufacturing process of an automotive transmission thereby reducing costs associated with this process.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A clutch assembly adapted to be fixed to the casing of a transmission, said assembly comprising:

a clutch housing having a clutch subassembly supported therein;

a piston housing having a piston subassembly supported therein;

said clutch housing abutting said piston housing such that said piston subassembly is moveable within said piston housing to actuate said clutch subassembly in said clutch housing;

at least one of said housings including at least one anti-rotation lug mounted thereon and adapted to be received in a corresponding recess in the casing of the transmission, said at least one anti-rotation lug including a slot therein and overlaying the other of said housings when they are disposed in abutting relation relative to one another;

said other of said housings including at least one tab extending therefrom and corresponding to said slot in said at least one anti-rotation lug, said tab received in said slot to lock said clutch housing and said piston housing together prior to installing said assembly in the transmission.

2. An assembly as set forth in claim 1 wherein said clutch housing is substantially annular in shape and defines an outer peripheral surface which is grounded to the transmission case, said at least one anti-rotation lug formed on the outer peripheral surface of said clutch housing.

3. An assembly as set forth in claim 2 wherein said piston housing is substantially annular in shape and defines an outer peripheral surface which corresponds to the outer peripheral surface of said clutch housing and is grounded to the transmission case, said at least one anti-rotation lug including a portion thereof disposed in over lapping relation to said outer peripheral surface of said piston housing.

4. An assembly as set forth in claim 3 wherein said slot is formed in said overlapping portion of said anti-rotation lug and said at least one tab is formed on the outer peripheral surface of said piston housing and received in said slot.

5. An assembly as set forth in claim 1 wherein said slot extends in a radial direction into said at least one anti-rotation lug relative to said clutch assembly, said slot having at least one opening at the side of said at least one anti-rotation lug, said tab received in said slot through said opening at the side of said anti-rotation lug upon relative rotational movement between said piston housing and said clutch housing.

6. An assembly as set forth in claim 1 wherein said at least one tab includes a radially extending ridge, said slot includes a corresponding notch, said ridge received in said notch to locate said piston housing relative to said clutch housing when said tab is received in said slot.

7. An assembly as set forth in claim 1 wherein said clutch housing and said piston housing each present annular mating surfaces which are disposed in abutting contact relative to one another in said clutch assembly, said piston housing including an annular pilot flange extending from its respective mating surface in the direction of said clutch housing and which coacts with a corresponding surface on said clutch housing when said piston and clutch housings are disposed in abutting relation relative to one another.

8. An assembly as set forth in claim 1 wherein said assembly includes two anti-rotation lugs disposed on the outer peripheral surface of said at least one housing, said two anti-rotation lugs asymmetrically spaced relative to one another on said at least one housing and received in corresponding recesses in the transmission case.

9. An assembly as set forth in claim 8 wherein one of said two anti-rotation lugs defines a geometric shape which is different from the other of said two anti-rotation lugs.

10. An assembly as set forth in claim 9 wherein one of said two anti-rotation lugs defines a substantially rectangular shape when viewed in cross-section and the other defines a substantially triangular shaped when viewed in cross-section.

11. An automotive transmission assembly having an input shaft, an output shaft and at least one gear set operatively coupled between the shafts, said assembly comprising:

a transmission casing for supporting the input shaft, output shaft and the gear set of said transmission assembly;

a clutch assembly adapted to be fixed to said transmission casing, said clutch assembly including a clutch housing having a clutch subassembly supported therein and a piston housing having a piston subassembly supported therein;

said clutch housing abutting said piston housing such that said piston subassembly is moveable within said piston housing to actuate said clutch subassembly in said clutch housing;

at least one of said housings including at least one anti-rotation lug mounted thereon and adapted to be received in a corresponding recess in said transmission casing, said at least one anti-rotation lug including a slot therein and overlaying the other of said housings when they are disposed in abutting relation relative to one another;

said other of said housings including at least one tab extending therefrom and corresponding to said slot in said at least one anti-rotation lug, said tab received in said slot to lock said clutch housing and said piston housing together prior to installing said clutch assembly in said transmission assembly.

12. An assembly as set forth in claim 11 wherein said clutch housing is substantially annular in shape and defines an outer peripheral surface which is grounded to said transmission case, said at least one anti-rotation lug formed on the outer peripheral surface of said clutch housing.

13. An assembly as set forth in claim 11 wherein said piston housing is substantially annular in shape and defines an outer peripheral surface which corresponds to the outer peripheral surface of said clutch housing and is grounded to said transmission case, said at least one anti-rotation lug including a portion thereof disposed in over lapping relation to said outer peripheral surface of said piston housing.

14. An assembly as set forth in claim 13 wherein said slot is formed in said overlapping portion of said anti-rotation lug and said at least one tab is formed on the outer peripheral surface of said piston housing and received in said slot.

15. An assembly as set forth in claim 11 wherein said slot extends in a radial direction into said at least one anti-rotation lug relative to said clutch assembly, said slot having at least one opening at the side of said at least one anti-rotation lug, said tab received in said slot through said opening at the side of said anti-rotation lug upon relative rotational movement between said piston housing and said clutch housing.

16. An assembly as set forth in claim 11 wherein said at least one tab includes a radially extending ridge, said slot includes a corresponding notch, said ridge received in said notch to locate said piston housing relative to said clutch housing when said tab is received in said slot.

17. An assembly as set forth in claim 11 wherein said clutch housing and said piston housing each present annular mating surfaces which are disposed in abutting contact relative to one another in said clutch assembly, said piston housing including an annular pilot flange extending from its respective mating surface in the direction of said clutch assembly and which coacts with a corresponding surface on said clutch housing when said piston and clutch housings are disposed in abutting relation relative to one another.

18. An assembly as set forth in claim 11 including two anti-rotation lugs disposed on the outer peripheral surface of said at least one housing, said two anti-rotation lugs asymmetrically spaced relative to one another on said at least one housing and received in corresponding recesses in said transmission case.

19. An assembly as set forth in claim 18 wherein one of said two anti-rotation lugs defines a geometric shape which is different from the other of said two anti-rotation lugs.

20. An assembly as set forth in claim 19 wherein one of said two anti-rotation lugs defines a substantially rectangular shape when viewed in cross-section and the other defines a substantially triangular shaped when viewed in cross-section.

* * * * *